United States Patent
Peterson et al.

(10) Patent No.: US 8,652,264 B2
(45) Date of Patent: Feb. 18, 2014

(54) REAR WASHER FLUID ENABLE/DISABLE

(75) Inventors: Dave Peterson, East Liberty, OH (US); John Sgueglia, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 13/421,968

(22) Filed: Mar. 16, 2012

(65) Prior Publication Data

US 2013/0087169 A1 Apr. 11, 2013

Related U.S. Application Data

(62) Division of application No. 12/062,558, filed on Apr. 4, 2008, now Pat. No. 8,136,197.

(51) Int. Cl.
*B08B 1/00* (2006.01)
*B60S 1/58* (2006.01)
*B60S 1/46* (2006.01)

(52) U.S. Cl.
USPC ............ 134/6; 134/18; 15/250.17; 15/250.01

(58) Field of Classification Search
CPC ........... B60S 1/485; B60S 1/486; B60S 1/583
USPC .................. 15/250.01, 250.17; 134/6, 18
See application file for complete search history.

(56) References Cited

U.S. PATENT DOCUMENTS

| | | | |
|---|---|---|---|
| 2,833,536 A * | 5/1958 | Joachim et al. | ............ 49/139 |
| 4,276,501 A | 6/1981 | Fanz | |
| 4,728,870 A | 3/1988 | Hirano et al. | |
| 5,512,806 A | 4/1996 | Papazian et al. | |
| 5,519,258 A * | 5/1996 | Stroven et al. | ............ 307/10.1 |
| 5,698,907 A * | 12/1997 | Weber | ............ 307/10.1 |
| 5,722,108 A | 3/1998 | Sakyo et al. | |
| 5,917,298 A | 6/1999 | Miller | |
| 5,929,588 A | 7/1999 | Shiah | |
| 5,932,983 A | 8/1999 | Maue et al. | |
| 5,953,786 A | 9/1999 | Maue et al. | |
| 6,019,292 A | 2/2000 | Walther | |
| 6,111,378 A | 8/2000 | LeMay et al. | |
| 6,154,124 A | 11/2000 | Jackman et al. | |
| 6,205,612 B1 | 3/2001 | Tilli et al. | |
| 6,240,593 B1 | 6/2001 | Murata | |
| 6,242,876 B1 | 6/2001 | Thompson | |
| 6,420,799 B1 | 7/2002 | Sakamoto et al. | |
| 6,587,759 B2 | 7/2003 | Obradovich et al. | |
| 6,792,643 B1 | 9/2004 | Ponziani | |
| 6,900,555 B2 | 5/2005 | Sakamoto et al. | |
| 6,902,118 B2 | 6/2005 | Shank et al. | |
| 7,246,840 B2 | 7/2007 | Gates et al. | |
| 7,316,048 B2 | 1/2008 | Yamane et al. | |
| 8,052,802 B2 | 11/2011 | Binfet et al. | |

FOREIGN PATENT DOCUMENTS

| | | |
|---|---|---|
| JP | 60092 | 5/1985 |
| JP | 2001301579 | 10/2001 |

* cited by examiner

*Primary Examiner* — Michael Barr
*Assistant Examiner* — Caitlin N Dunlap
(74) *Attorney, Agent, or Firm* — Mark E. Duell; Emerson Thomson Bennett, LLC

(57) ABSTRACT

A method and apparatus for preventing the dispensing of a washer fluid onto a rear windshield upon detecting the disablement of the rear wiper arm is provided. The disablement of the rear wiper arm may be caused by the movement of the rear windshield from a fully closed position to an open position.

20 Claims, 13 Drawing Sheets

REAR WASHER FLUID ENABLE/DISABLE

This application is a division of U.S. patent application Ser. No. 12/062,558, filed 4 Apr. 2008, now U.S. Pat. No. 8,136,197, which is hereby incorporated by reference.

I. BACKGROUND OF THE INVENTION

A. Field of Invention

This invention pertains to the art of methods and apparatuses regarding vehicle window washer devices, and more specifically to apparatuses and methods regarding rear window washer fluid control devices.

B. Description of the Related Art

It is known to manufacture a vehicle that includes a rear windshield. Often, the rear windshield can be opened or lowered independent of a rear-facing door or tailgate. The opening or lowering of the rear windshield allows an operator to conveniently access the rear interior portion of the vehicle. Commonly, the rear windshield is used in combination with a rear wiper system. The rear wiper system may comprise a wiper arm that oscillates across the rear windshield in order to improve the vehicle operator's rearward field of view. Additionally, the rear washer system may allow the vehicle operator to selectively dispense or spray a fluid, commonly referred to as washer fluid, onto the rear windshield, in conjunction with the oscillation of the wiper arm, thereby increasing the effectiveness of the rear wiper system in various circumstances. Commonly, a single selector device comprising a combination switch, as is well known in the art, is used to selectively control the operation of the rear wiper system.

When an attempt is made to open or lower the rear windshield during operation of the rear wiper assembly, a control unit may cause the wiper arm to "force park" or move to a predetermined position, commonly referred to as a "parked position," prior to causing the rear windshield to open or lower. The parked position may require the wiper arm to be positioned out of contact with the rear windshield such that the wiper arm will not impede the opening or lowering of the rear windshield. Upon movement of the wiper arm to the parked position, the control unit may then cause the rear windshield to open. Commonly, the control unit will cause the rear wiper arm to resume operating upon movement of the rear windshield back to the fully closed position.

Although known methods work well for their intended purpose, several disadvantages exist. Despite the wiper arm being disabled upon the occurrence of a predetermined condition, the rear wiper system is still able dispense or spray washer fluid. The use of a single selector device to control the operation of the rear wiper system frequently results in operator error during manipulation of the selector device. For example, an operator intending to cause washer fluid to be dispensed on the vehicle's front windshield may unintentionally manipulate the selector device in the wrong direction and instead cause washer fluid to be dispensed or sprayed onto the rear windshield. If the rear windshield is lowered or otherwise opened when the rear washer is erroneously selected, the dispensed washer fluid may enter the interior portion of the vehicle. Additionally, because the wiper arm is disabled or parked as a result of the rear windshield being opened or lowered, it may take an increased amount of time to detect the erroneous selection. The increased detection time may result from the vehicle operator hearing the associated washer pump operating combined with not seeing any washer fluid being dispensed onto the intended windshield. The increased detection time may result in an increased amount of washer fluid entering into the interior portion of the vehicle thereby increasing the amount of damage caused.

What is need then is a method and apparatus for preventing the dispensing of washer fluid onto the rear windshield when the rear windshield is not in a fully closed position.

II. SUMMARY OF THE INVENTION

According to one embodiment of the invention, a method comprises the steps of receiving a first input signal, determining the position of a rear windshield, and operating a washer motor pump. The first input signal initiates a process for causing the operation of the washer motor pump. The washer motor pump operates to dispense a fluid onto the rear windshield only if the position of the rear windshield is determined to be fully closed.

According to another embodiment of the invention, a method comprises the steps of receiving a first input signal, determining the position of a rear windshield, operating a washer motor pump, determining the actuation of one of a plurality of operator actuated devices for causing the rear windshield to move from the fully closed position, and causing the termination of the operation of the washer motor pump. The first input signal initiates a process for causing the operation of the washer motor pump. The washer motor pump operates to dispense a fluid onto the rear windshield only if the position of the rear windshield is determined to be fully closed.

According to another embodiment of the invention, a method comprises the steps of receiving a first input signal, determining the position of a rear windshield, determining the position of a lift gate, and operating a washer motor pump. The first input signal initiates a process for causing the operation of the washer motor pump. The washer motor pump operates to dispense a fluid onto the rear windshield only if the position of the rear windshield and the position of the lift gate are determined to be fully closed.

According to another embodiment of the invention, a method comprises the steps of receiving a first input signal, determining the position of a rear windshield, determining the position of a lift gate, operating a washer motor pump, determining the actuation of one of a plurality of operator actuated devices for causing the lift gate to move from the fully closed position, and causing the termination of the operation of the washer motor pump. The first input signal initiates a process for causing the operation of the washer motor pump. The washer motor pump operates to dispense a fluid onto the rear windshield only if the position of the rear windshield and the position of the lift gate are determined to be fully closed.

According to another embodiment of the invention, a method comprises the steps of receiving a first input signal, determining the position of a rear windshield, operating a washer motor pump, and oscillating a rear wiper arm between a first operating position and a second operating position. The first input signal initiates a process for causing the operation of the washer motor pump. The washer motor pump operates to dispense a fluid onto the rear windshield only if the position of the rear windshield is determined to be fully closed.

According to one embodiment of the invention, a vehicle comprises a rear-facing side, a rear windshield, an aperture formed in the rear-facing side, and a rear wiper-washer system. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper arm if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield is pivotally coupled to the rear-facing side and encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper arm if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield is fixedly attached to the rear-facing side and encloses the aperture.

The rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper min if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The supply reservoir and the washer motor pump are located within an interior space defined by an outer surface of the rear-facing side. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper arm if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The supply reservoir and the washer motor pump are located within an engine compartment. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper arm if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The wiper driving apparatus is at least partially positioned within an interior space defined by an outer surface of the rear-facing side. The wiper driving apparatus comprises a rear wiper motor, a rear wiper down relay, and a rear wiper up relay. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper arm if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear-facing side comprises a lift gate. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, a fifth switch, a sixth switch, and a seventh switch. The first switch generates an input signal indicating a vehicle ignition status. The second switch is for initiating a process for moving the rear windshield from a fully closed position to an open position. The third switch is for generating an input signal indicating the position of the rear windshield. The fourth switch is for initiating a process for operating the washer motor pump. The fifth switch is for initiating a process for causing the oscillation of the rear wiper arm. The sixth switch is for generating an input signal indicating the position of the lift gate. The seventh switch is for initiating a process for moving the lift gate from a fully closed position to an open position. The control system determines the position of the rear windshield prior to initiating the process for operating the washer motor pump and the control system prevents the initiation of the process for operating the washer motor pump if the rear windshield is determined to be in an open position. The control system determines the position of the rear windshield and the lift gate prior to initiating the process for causing the oscillation of the rear wiper arm and the control system prevents the initiation of the process for causing the oscillation of the rear wiper arm if the rear windshield or the lift gate is determined to be in an open position. The control system causes the termination of the operation of the washer motor pump and causes the termination of the oscillation of the rear wiper arm upon the initiation of a process for moving the rear windshield or the lift gate from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The second switch comprises a plurality of operator actuated devices. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper arm if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper arm.

According to another embodiment of the invention, a vehicle comprises a rear-facing side, a rear windshield, an aperture formed in the rear-facing side, and a rear wiper-washer system. The rear windshield encloses the aperture and the rear wiper-washer system comprises a rear wiper assembly, a fluid supply portion, an actuator portion, and a control system. The rear wiper assembly comprises a rear wiper arm and a rear washer nozzle assembly. The fluid supply portion comprises a supply reservoir, a washer motor pump, and a fluid delivery conduit. The washer motor pump and the fluid delivery conduit work in conjunction to move a fluid from the supply reservoir to the rear wiper assembly. The actuator portion comprises a wiper driving apparatus and an output shaft. The wiper driving apparatus is operatively coupled to the output shaft and the output shaft is operatively coupled to the rear wiper arm. The operation of the wiper driving apparatus at least partially causes the oscillation of the rear wiper arm. The control system comprises a first switch, a second switch, a third switch, a fourth switch, and a fifth switch. The first switch generates an input signal indicating a vehicle ignition status. The second switch is for initiating a process for moving the rear windshield from a fully closed position to an open position. The second switch comprises a plurality of operator actuated devices. The plurality of operator actuated devices comprise a device chosen from the group consisting of an interior rear windshield switch, an exterior rear windshield switch, and a key fob having a remote rear windshield switch. The third switch is for generating an input signal indicating the position of the rear windshield. The fourth switch is for initiating a process for operating the washer motor pump. The fifth switch is for initiating a process for causing the oscillation of the rear wiper arm. The control system determines the position of the rear windshield prior to initiating the process for operating the washer motor pump and the control system prevents the initiation of the process for operating the washer motor pump if the rear windshield is determined to be in an open position. The control system determines the position of the rear windshield prior to initiating the process for causing the oscillation of the rear wiper arm and the control system prevents the initiation of the process for causing the oscillation of the rear wiper aim if the rear windshield is determined to be in an open position. The control system causes the termination of the operation of the washer motor pump and causes the termination of the oscillation of the rear wiper arm upon the initiation of a process for moving the rear windshield from a fully closed position to an open position during the operation of either the washer motor pump or the oscillation of the rear wiper aim.

One advantage of this invention is that a vehicle operator is prevented from accidentally dispensing or spraying washer fluid through a lowered or open rear windshield.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
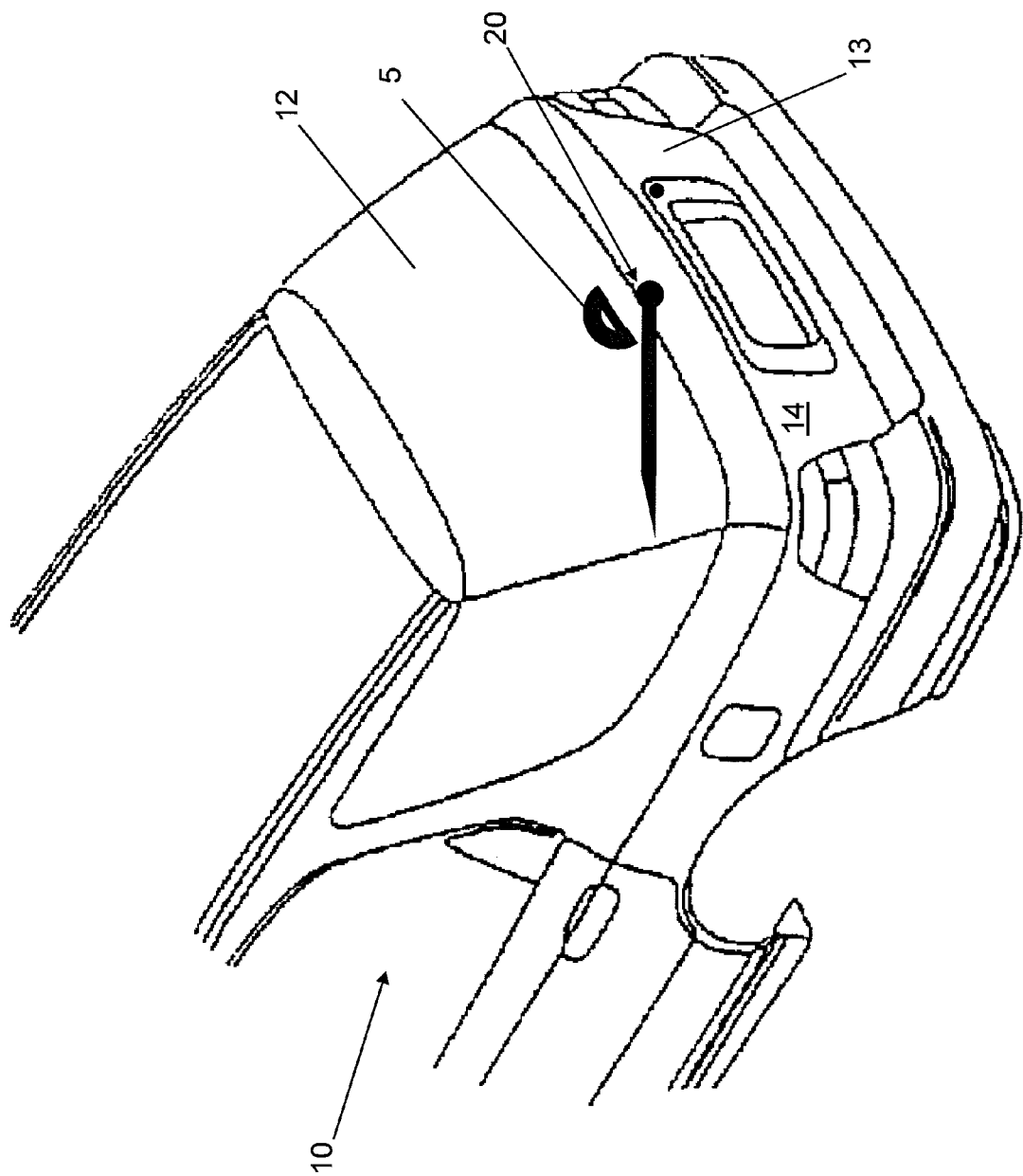
FIG. 1 is a perspective view of a vehicle comprising a rear wiper-washer system according to one embodiment of the invention.
Figure 2:
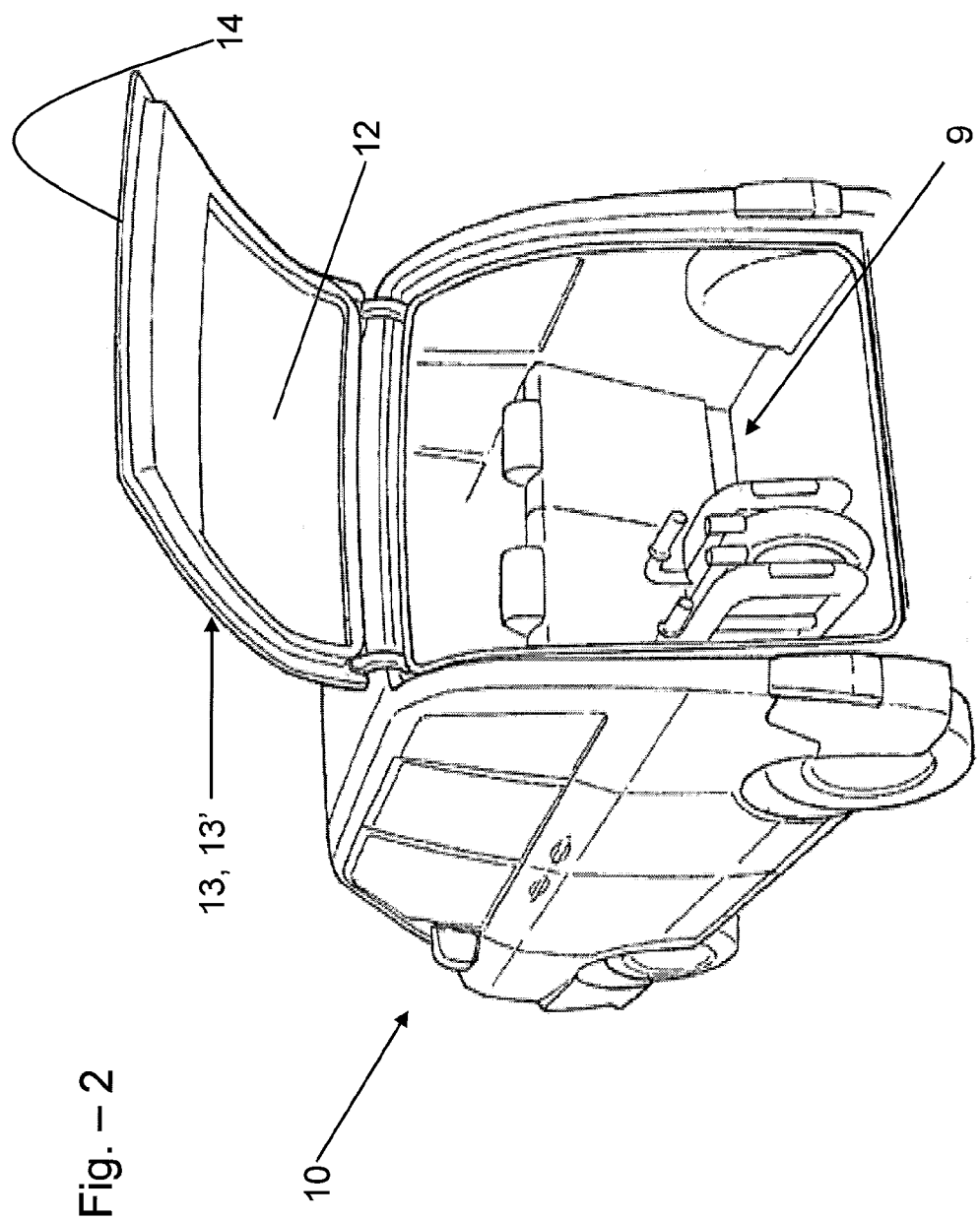
FIG. 2 is a perspective view of a vehicle comprising a lift gate in an open position according to one embodiment of the invention.
Figure 3:
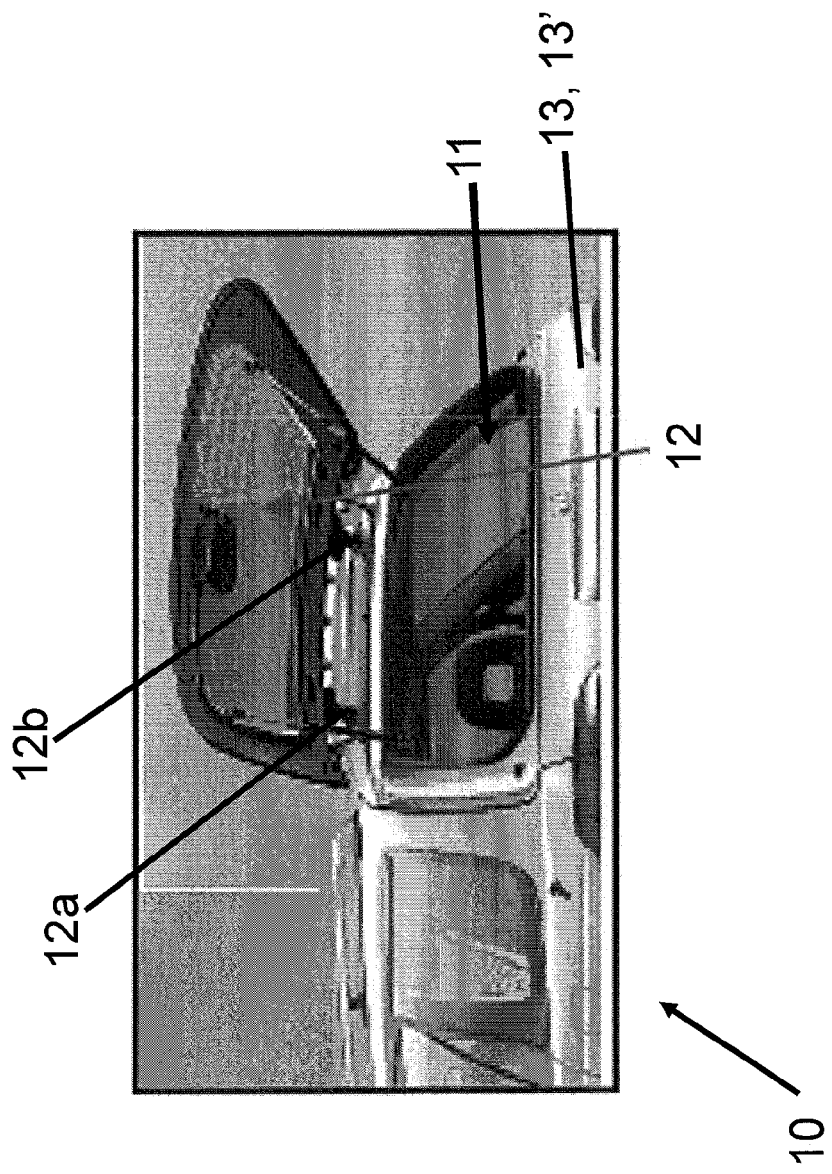
FIG. 3 is a perspective view of a vehicle showing a rear windshield in an open position according to one embodiment of the invention.

Referring now to the drawings wherein the showings are for purposes of illustrating embodiments of the invention only and not for purposes of limiting the same, FIGS. 1-3 show a vehicle 10 comprising a rear windshield 12 and a rear wiper-washer system 20 according to one embodiment of the invention. The rear windshield 12 may enclose an aperture or opening 11 (as shown in FIG. 3) formed in a rear-facing side 13 of the vehicle 10. A pair of hinges 12a, 12b may pivotally couple the rear windshield 12 to the rear-facing side 13. The pair of hinges 12a, 12b may allow the pivotal movement of the rear windshield 12 between a fully closed position (as shown in FIG. 1), wherein the rear windshield 12 is substantially sealed to the rear-facing side 13, and an open position (as shown in FIG. 3), wherein at least one edge of the rear windshield 12 is spaced apart from the corresponding adjacent edge of the aperture 11. In another embodiment, the rear-facing side 13 may comprise a lift gate 13' (as shown in FIG. 2). In yet another embodiment, the rear-facing side 13 may be fixedly attached to the vehicle 10. The rear windshield 12 and the rear-facing side 13 may comprise any type and combination of rear windshield 12 and rear-facing side 13, wherein the rear windshield is able to be opened independent of the rear-facing side 13, chosen with the sound judgment used of a person using ordinary skill in the art.

Figure 4:
FIG. 4 is a perspective view of an interior rear windshield switch positioned within the interior portion of a vehicle according to one embodiment of the invention.
Figure 5:
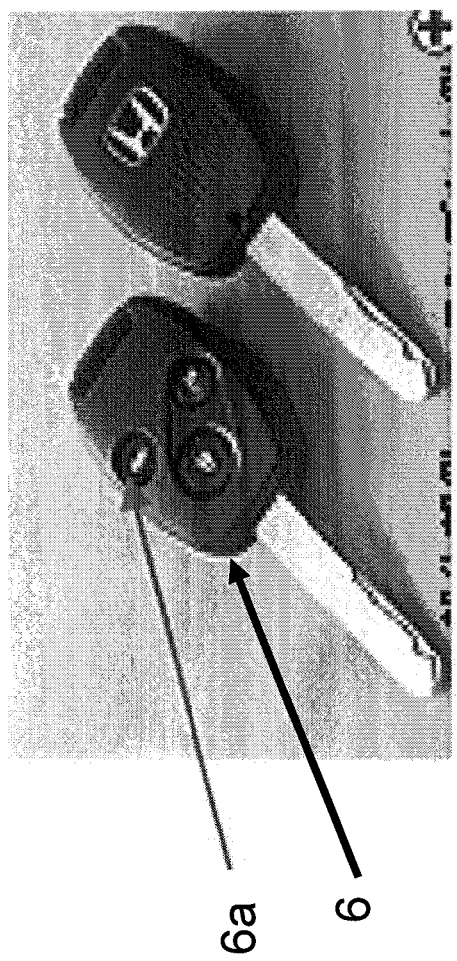
FIG. 5 is a perspective view of a remote rear windshield switch located on a key fob according to one embodiment of the invention.
Figure 6:
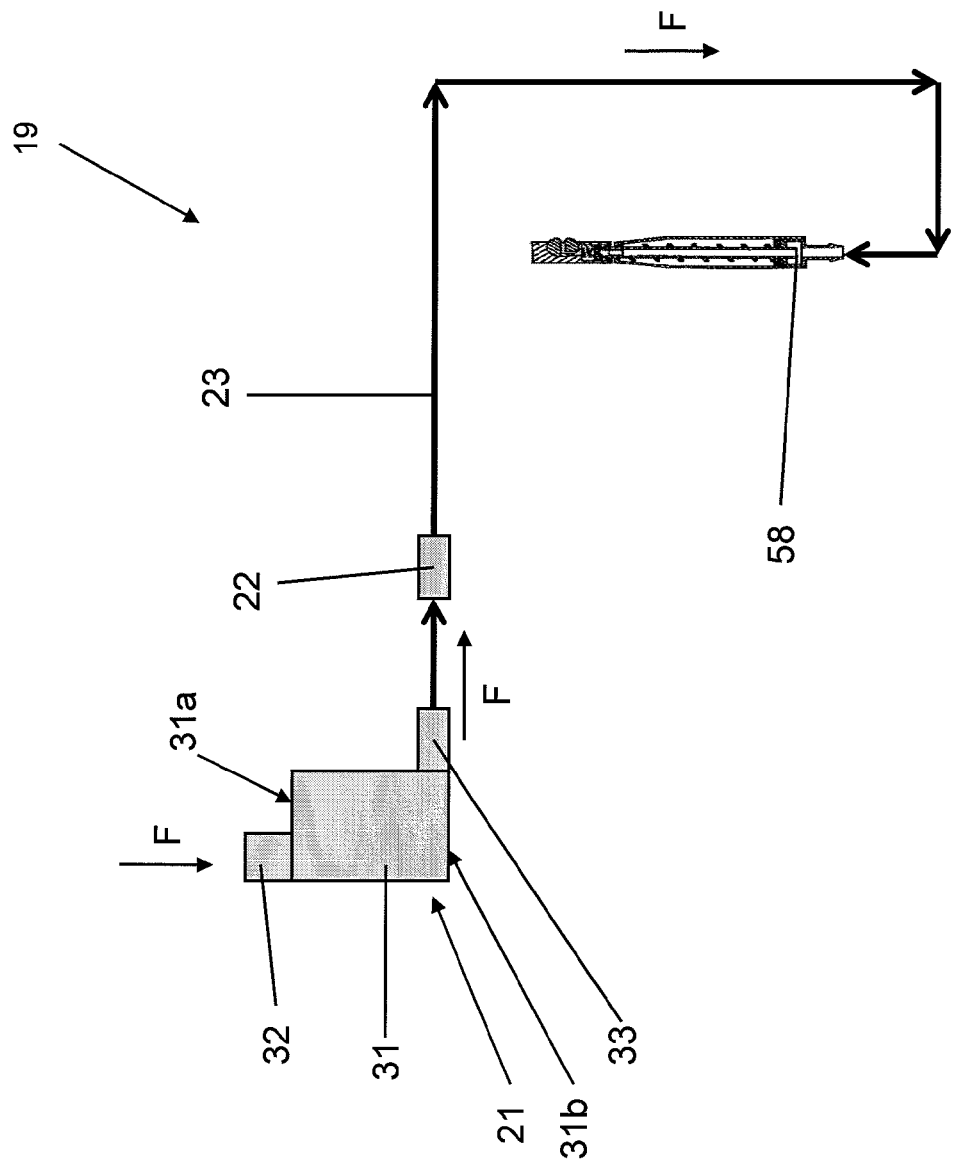
FIG. 6 is a block diagram of a fluid supply portion according to one embodiment of the invention.

With reference now to FIGS. 1, 4, and 5, the vehicle 10 may comprise a plurality of operator actuated devices for causing the rear windshield 12 or the lift gate 13' to move between a fully closed position and an open position. In one embodiment, the plurality of operator actuated devices for causing the rear windshield 12 or the lift gate 13' to move between the fully closed position and the open position may comprise an interior rear windshield switch 4 positioned within the interior portion 9 of the vehicle 10 (as shown in FIG. 4), an exterior rear windshield switch 5 that may be located on the outer surface of the rear windshield 12 (as shown in FIG. 1), and a remote rear windshield switch 6a located on a key fob 6 (as shown in FIG. 5). In one embodiment, the key fob 6 may comprise an electronic device suitable for placement on a key ring or chain as is well known in the art. The key fob 6 may comprise at least a first operator actuated button, such as the remote rear windshield switch 6a. The operator actuated buttons may allow the operator to cause the vehicle's doors to lock or unlock or to release or open the rear windshield 12. The vehicle 10 may comprise any number and type of device for causing the rear windshield 12 or the lift gate 13' to move from the fully closed position to the open position chosen with the sound judgment of a person using ordinary skill in the art.

With reference now to FIGS. 1, 6, 7, and 12, the rear wiper-washer system 20 may comprise a fluid-supply portion 19, an actuator portion 40, a rear wiper assembly 58, and a control system 300. The fluid-supply portion 19 may comprise a supply reservoir 21, a washer motor pump 22, and a fluid delivery conduit 23. The supply reservoir 21 and the washer motor pump 22 may be located within an interior space 16 (shown in FIG. 7) defined by an outer surface 14 of the rear-facing side 13. In another embodiment, the supply reservoir 21 and the washer motor pump 22 may be located within an engine compartment (not shown) of the vehicle 10. The supply reservoir 21 and the washer motor pump 22 may be located in any position chosen with the sound judgment of a person using ordinary skill in the art. The supply reservoir 21 may comprise a tank main body 31, a reservoir inlet 32, and a reservoir outlet 33. The reservoir inlet 32 may be attached to the top portion 31a of the tank main body 31 and may comprise an opening suitable for a vehicle operator to deposit a fluid F, such as a windshield washer cleaning fluid, through the reservoir inlet 32 and into the tank main body 31. The reservoir outlet 33 may be attached to the bottom portion 31b of the tank main body 31 and may allow the fluid F to exit the tank main body 31. The fluid delivery conduit 23 may connect the reservoir outlet 33 to the rear wiper portion 58. The washer motor pump 22 may work in conjunction with the fluid delivery conduit 23 to move the fluid F from the supply reservoir 21 to the rear wiper assembly 58. Utilizing a pump and conduit to move fluid through a conduit is well known in the art and any known method, chosen with the sound judgment of a person using ordinary skill in the art, may be used.

Figure 10:
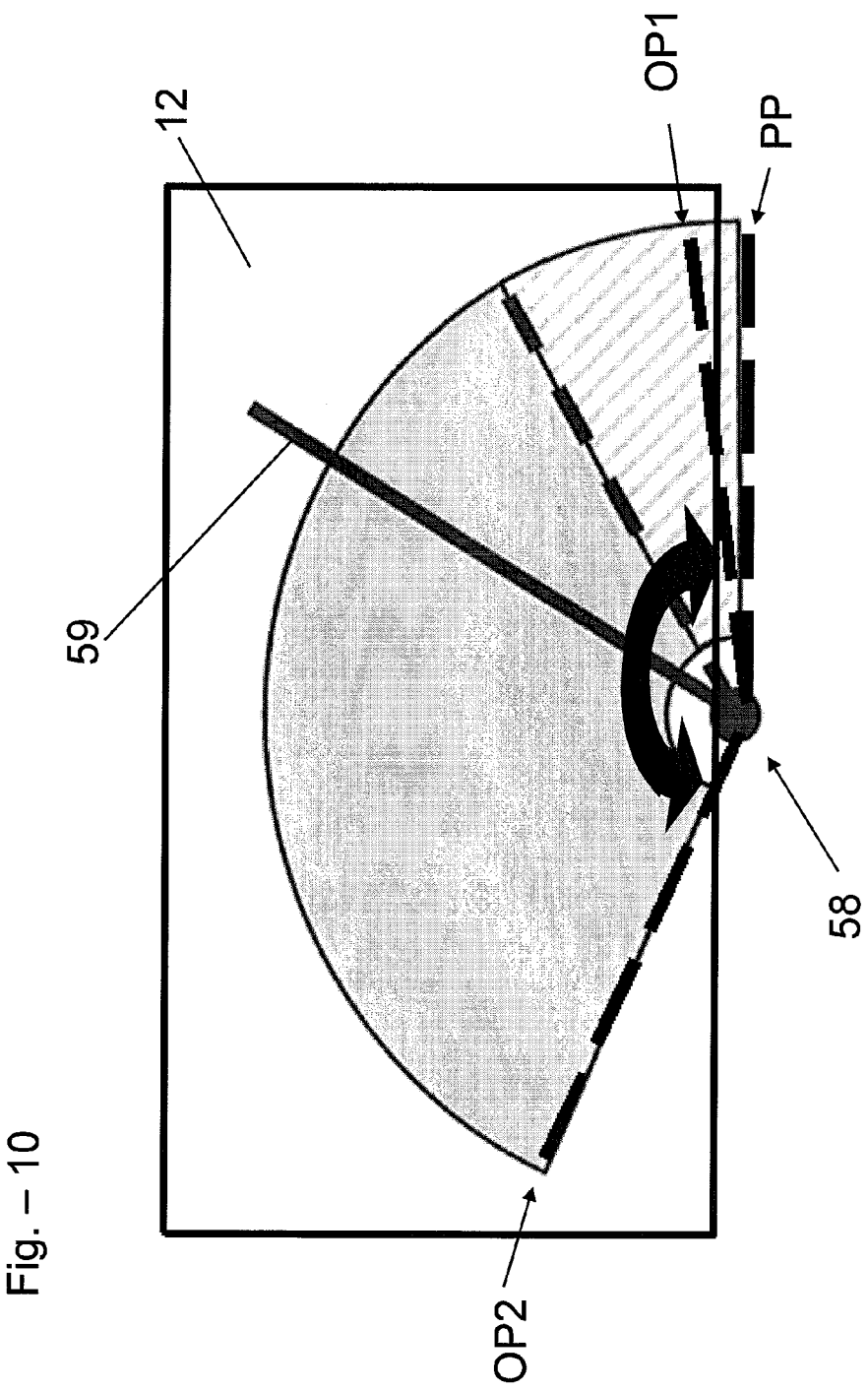
FIG. 10 is a representation of a rear wiper arm according to one embodiment of the invention.
Figure 12:
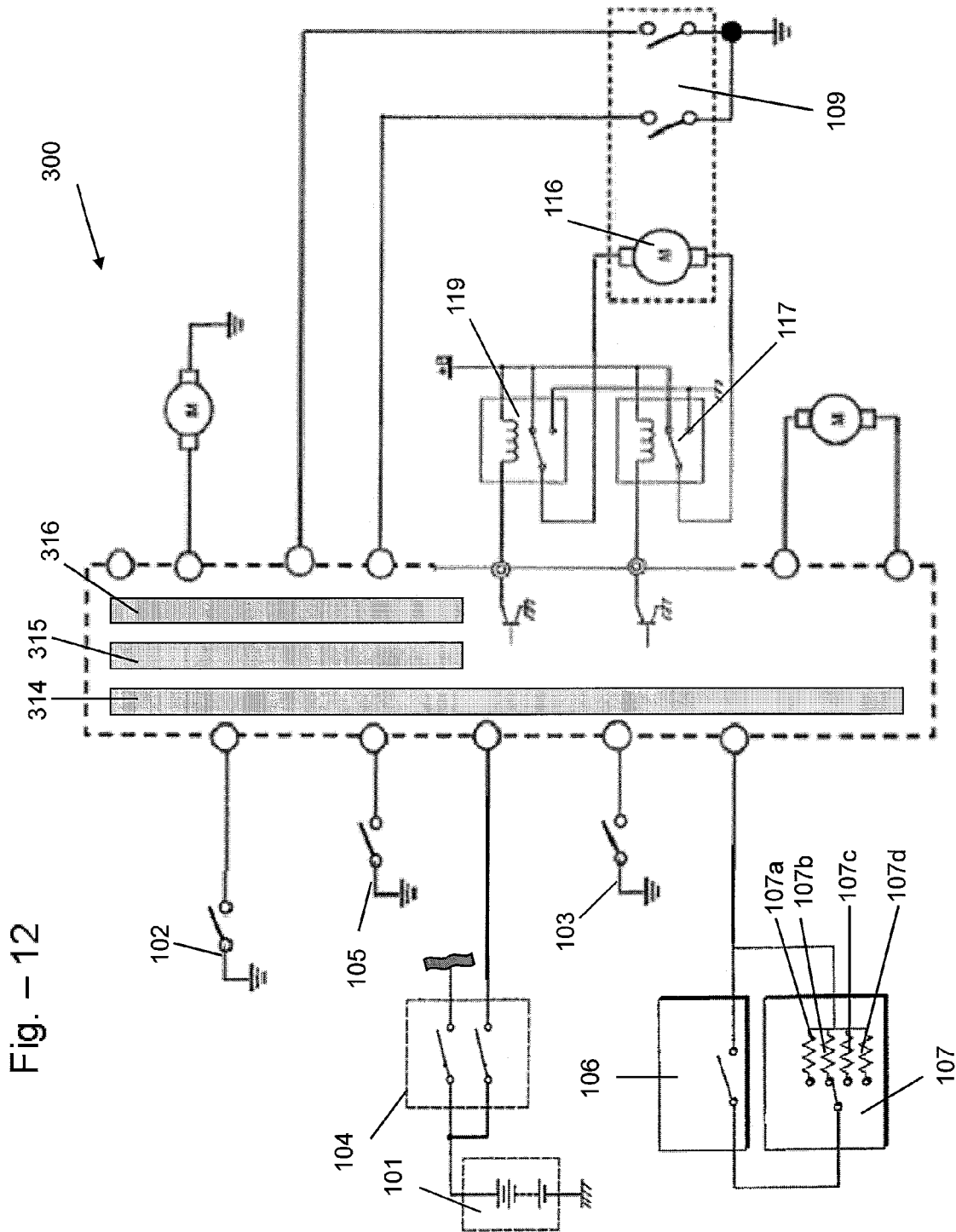
FIG. 12 is a schematic diagram of a control system of a rear wiper-washer system according to one embodiment of the invention.
Figure 14:
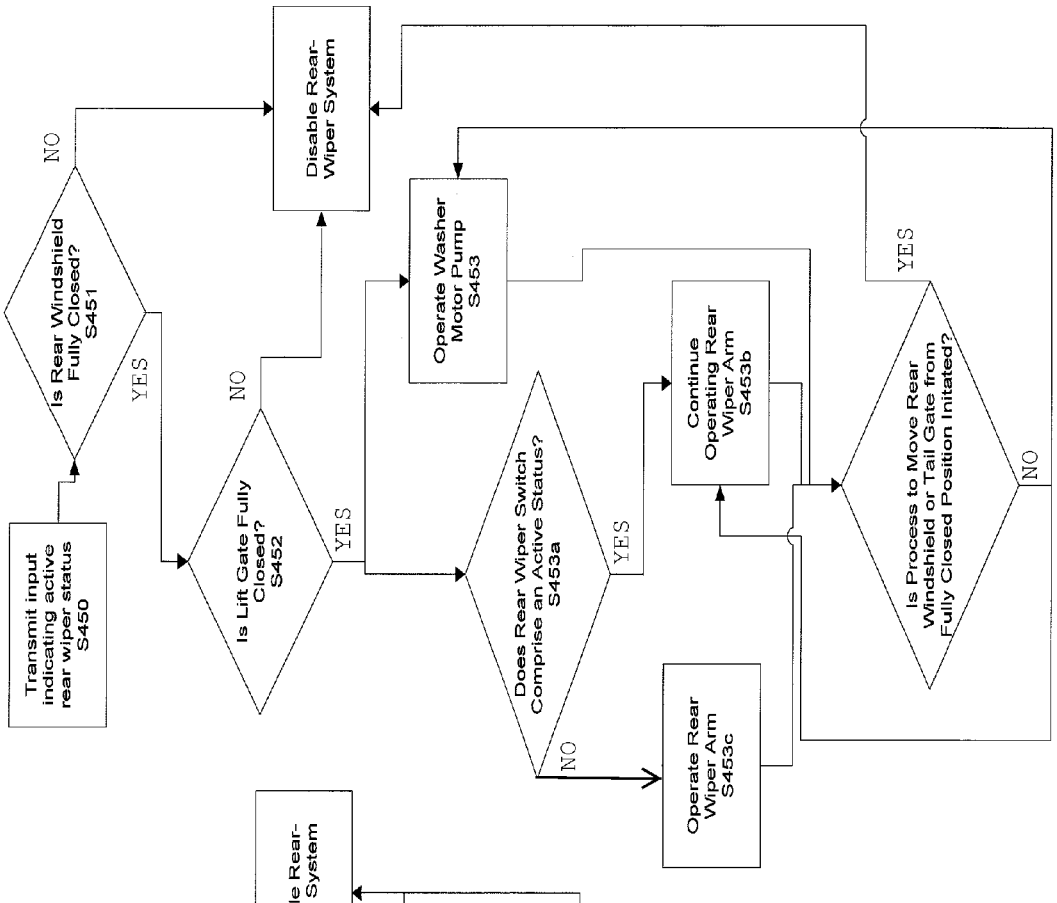
FIG. 14 is a flow chart illustrating a method to control a washer motor pump of a rear wiper-washer system according to one embodiment of the invention.

With reference now to FIGS. 7-10, and 12, the actuator portion 40 may comprise a wiper driving apparatus 41 and an output shaft 42. The wiper driving apparatus 41 may be at least partially positioned within the interior space 16 of the rear-facing side 13. The wiper driving apparatus 41 may comprise a rear wiper motor 116, a rear wiper down relay 117, and a rear wiper up relay 119 (as shown in FIG. 12). The rear wiper driving apparatus 41 may be operatively coupled to the output shaft 42. The output shaft 42 may extend from within the interior space 16 out through the outer surface 14 of the rear-facing side 13. The rear wiper assembly 58 may comprise a rear wiper arm 59 and a rear washer nozzle assembly 60. The rear wiper arm 59 may comprise a rear wiper shaft 61 and a rear wiper blade 63. The rear wiper shaft 61 may be operatively coupled to the output shaft 42 such that the operation of the wiper driving apparatus 41 may at least partially cause the oscillation or movement of the rear wiper arm 59 as described below. The rear wiper blade 63 may extend from the rear wiper shaft 61 and contact the rear windshield 12. The rear wiper blade 63 may comprise a non-abrasive flexible composition, such as a rubber, as is well known in the art, and may contact the rear windshield 12 such that the oscillation of the wiper arm 59 between a first and a second operating position OP1, OP2 (as shown in FIG. 10) may cause the rear wiper blade 63 to at least partially remove any water, snow, or other debris from the rear windshield 12.

Figure 11:
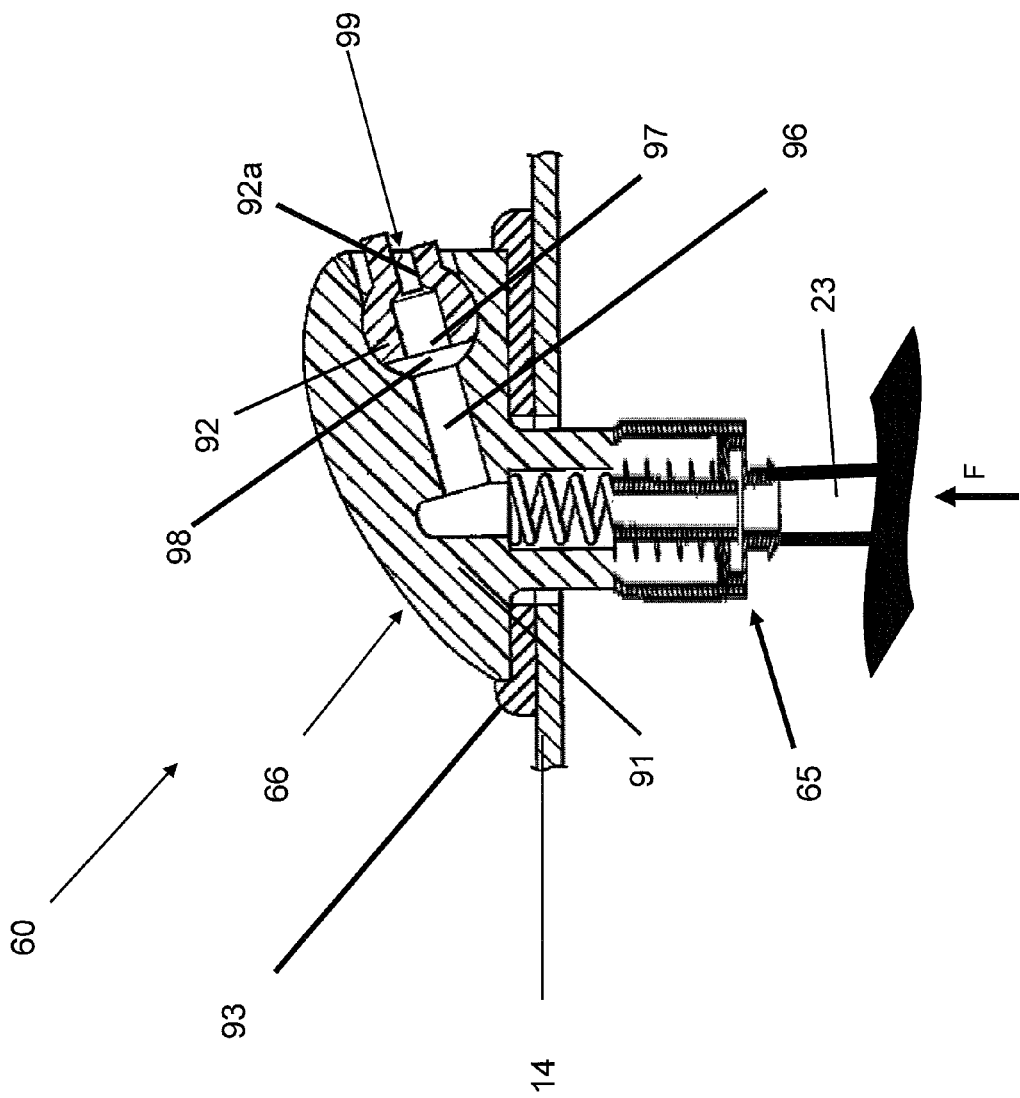
FIG. 11 is a perspective cut-away view of a washer nozzle assembly according to one embodiment of the invention.

With reference now to FIGS. 1 and 11, the rear washer nozzle assembly 60 of the rear wiper assembly 58 may allow for the fluid F to be dispensed onto the rear windshield 12. The rear washer nozzle assembly 60 may comprise a fluid intake portion 65 and a nozzle head portion 66. The fluid intake portion 65 may be positioned within the interior space 16 of the rear-facing side 13. The fluid intake portion 65 may receive the fluid delivery conduit 23 and may allow the fluid F to pass from the fluid delivery conduit 23 to the nozzle head portion 66. The nozzle head portion 66 may be positioned adjacent to the outer surface 14 of the rear-facing side 13 adjacent to the rear windshield 12. The nozzle head portion 66 may comprise a nozzle head body 91, a nozzle tip member 92, and a seal plate 93. The nozzle head body 91 may comprise a fluid passage 96, a nozzle head outlet 97, and a nozzle tip receiving portion 98. The seal plate 93 may be attached to the outer surface 14 of the rear-facing door 13. The seal plate 93 may contact the nozzle head body 91 and the outer surface 14 in such a manner as to create a seal or barrier that substantially prevents any moisture or debris from passing between the nozzle head body 91 and the outer surface 14. The fluid passage 96 may extend from the fluid intake portion 65, through the nozzle head body 91, and to the nozzle head outlet 97. The nozzle head outlet 97 may extend through the nozzle tip receiving portion 98 connecting the nozzle head body 91 to the nozzle tip member 92. The nozzle tip member 92 may comprise an outlet passage 92a and a nozzle tip outlet 99. The outlet passage 92a may allow the fluid F to pass from the nozzle head outlet 97 to the nozzle tip outlet 99. The nozzle tip outlet 99 may allow the fluid F to be dispensed through the washer nozzle assembly 60 and onto the rear windshield 12.

With reference now to FIGS. 2 and 12, a simplified schematic diagram of the control system 300 of the rear wiper-washer system 20 is shown. For purposes of clarity, an embodiment of the control system 300 wherein the rear-facing side 13 comprises a lift gate 13' is described. The control system 300 may comprise an ignition switch 104, a lift gate position switch 103, a rear windshield release switch 102, a lift gate release switch 108, a rear windshield position switch 105, a rear windshield washer switch 106 and a rear windshield wiper switch 107. The control system 300 may further comprise an input circuit 314, a microprocessor 315 and an output circuit 316. The ignition switch 104 may serve to generate an input signal indicating the vehicle ignition status. In one embodiment, the ignition switch 104 may generate an input signal indicating the vehicle ignition status as either active or inactive. The vehicle ignition status may be defined as active when the vehicle ignition switch 104 is in a position wherein the electrically powered vehicle systems, such as the rear wiper-washer system 20, is energized. In one embodiment, the vehicle ignition status is active when the vehicle ignition is in either a "run" or an "accessory" position wherein the electrically powered vehicle systems are energized by either a generator or the vehicle battery 101 as is well known in the art. The vehicle ignition status may be defined as inactive when the vehicle ignition switch 104 is in a position wherein the electrically powered vehicle systems are not energized. In one embodiment, the vehicle ignition switch 104 is inactive when the vehicle ignition is in an "off" or "start" position.

With continued reference now to FIGS. 2 and 12, the lift gate position switch 103 may serve to generate an input signal indicating whether the lift gate 13' is in an open position or a fully closed. Similarly, the rear windshield position switch 105 may serve to generate an input signal indicating whether the rear windshield 12 is in an open position or a fully closed. As previously stated, the lift gate position and the rear windshield position may respectively be defined as fully closed only when the lift gate 13' or the rear windshield 12 is securely closed. For any other position, such as ajar, the lift gate and rear windshield positions may respectively be defined as open. The rear windshield release switch 102 and the lift gate release switch 108 may serve to generate an input signal indicating the activation of at least one of the plurality of operator actuated devices for causing the rear windshield 12 or the lift gate 13', respectively, and thereby initiating a process for causing the rear windshield 12 or the lift gate 13' to move from the fully closed position to the open position. The rear windshield washer switch 106 may serve to generate an input signal for initiating a process for operating the washer motor pump 22 thereby causing the fluid F to be dispensed onto the rear windshield 12. The rear windshield wiper switch 107 may serve to generate an input signal for initiating a process for causing the rear wiper arm 59 to oscillate between the first operating position OP1 and the second operating position OP2. In another embodiment, the rear windshield wiper switch 107 may comprise an off position 107a, an intermittent position 107b, a low position 107c, and a high position 107d. The movement of the rear windshield wiper switch 107 to the off position 107a may serve to generate an input signal for causing the rear wiper arm 59 to move to the parked position PP. The movement of the rear windshield wiper switch 107 to the intermittent position 107b may serve to generate an input signal for initiating a process for causing the rear wiper arm 59 to oscillate intermittently between the first operating position OP1 and the second operating position OP2. The movement of the rear windshield wiper switch 107 to the low position 107c may serve to generate an input signal for initiating a process for causing the rear wiper arm 59 to oscillate between the first operating position OP1 and the second operating position OP2 at a first or low speed. The movement of the rear windshield wiper switch 107 to the high position 107d may serve to generate an input signal for initiating a process for causing the rear wiper arm 59 to oscillate between the first operating position OP1 and the second operating position OP2 at a second or high speed. The ignition switch 104, the lift gate position switch 103, the rear windshield/tailgate release switch 102, the rear windshield position switch 105, the rear windshield washer switch 106, and the rear windshield wiper switch 107 together may provide a means for generating a plurality of input signals.

Figure 7:
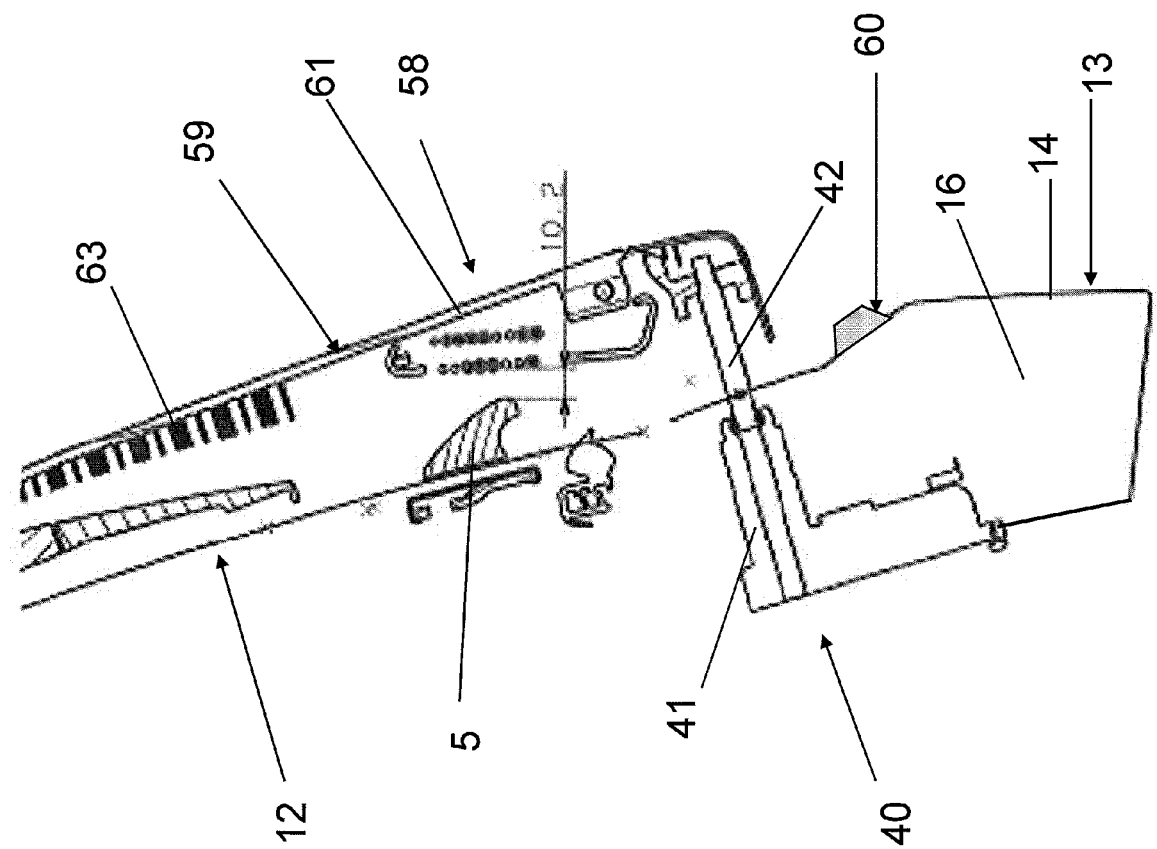
FIG. 7 is a perspective cut-away view of an actuator portion and a rear wiper assembly according to one embodiment of the invention.
Figure 8:
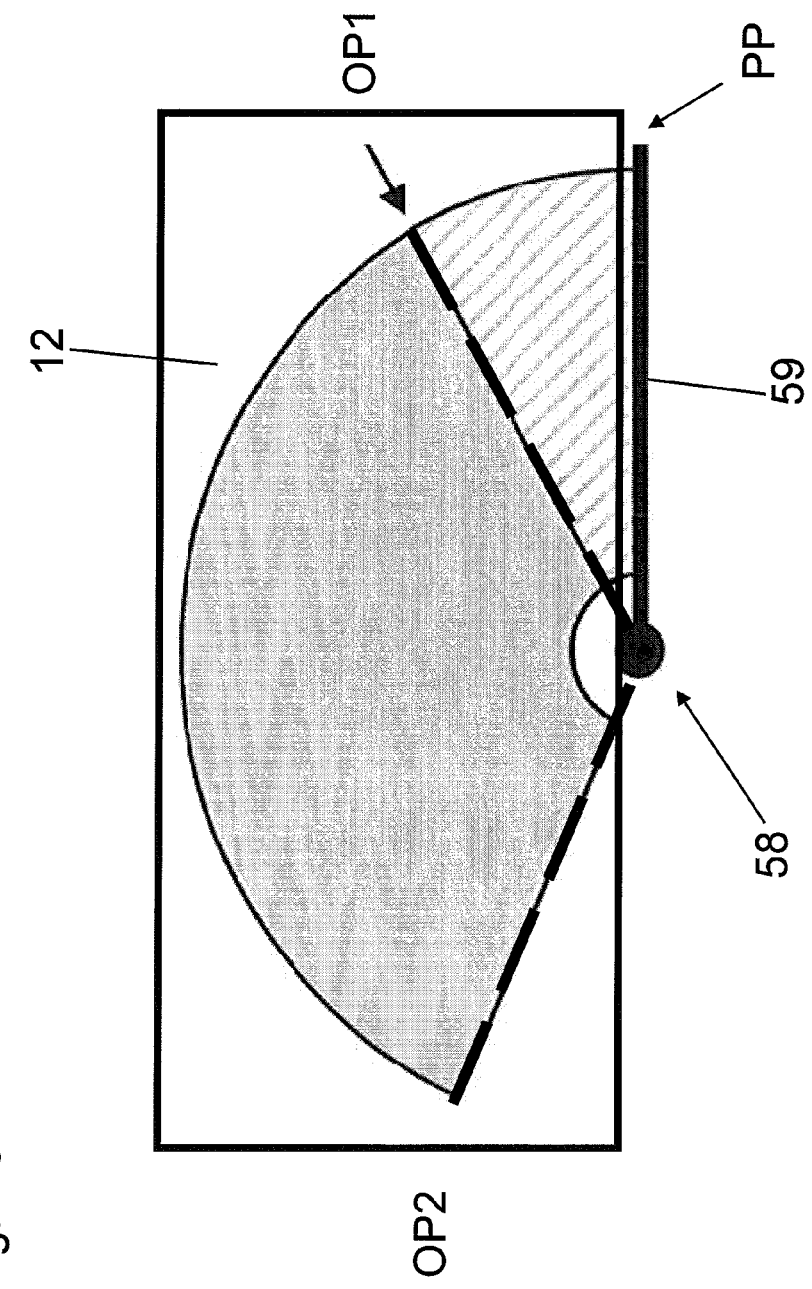
FIG. 8 is a representation of a rear wiper aim according to one embodiment of the invention.
Figure 9:
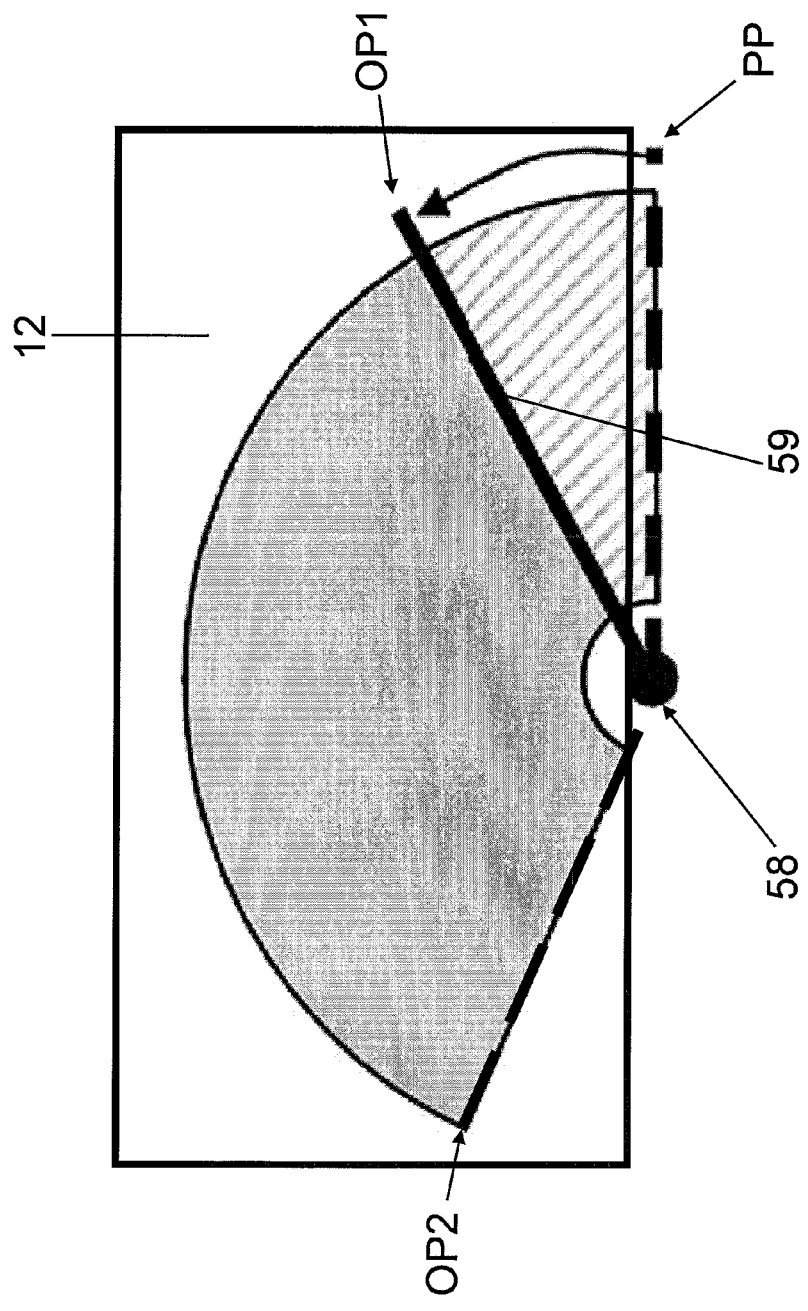
FIG. 9 is a representation of a rear wiper arm according to one embodiment of the invention.

With reference now to FIGS. 2, 7, and 12, the input circuit 314 may be in electrical communication with the ignition switch 104, the lift gate position switch 103, the rear windshield/tailgate release switch 102, the rear windshield position switch 105, the rear windshield washer switch 106, and the rear windshield wiper switch 107. The input circuit 314 may serve to buffer and filter the plurality of input signals generated during operation of the rear wiper-washer system 20. The microprocessor 315 may also be in electrical communication with the input circuit 314. The microprocessor 315 and the input circuit 314 may together provide a means for receiving and processing the plurality of input signals generated by the ignition switch 104, the lift gate position switch 103, the rear windshield release switch 102, the rear windshield position switch 105, the rear windshield washer switch 106, and the rear windshield wiper switch 107 in order to determine appropriate operations for the rear wiper-washer system 20. The microprocessor 315 may also be programmed and/or manufactured to provide various means for deciding to actuate the rear wiper arm 59 according to the method of the present invention as described in more detail below. The microprocessor 315 may also be in electrical communication with output circuit 316. The output circuit 316 may generate an output signal to control the rear wiper-washer sytem 20 in response to the plurality of inputs received by the input circuit 314. The output circuit 316 may activate or deactivate the rear wiper up relay 119 and the rear wiper down relay 117. The rear wiper up relay 119 and the rear wiper down relay 117 may be in electrical communication with the rear wiper driving apparatus 41 to cause the rear wiper arm 59 to actuate. A rear wiper motor status switch 109 may also be in electrical communication with the rear wiper driving apparatus 41 and with the control system 300 to provide feedback to the microprocessor 315 relating to the position of the rear wiper arm 59.

Figure 13:
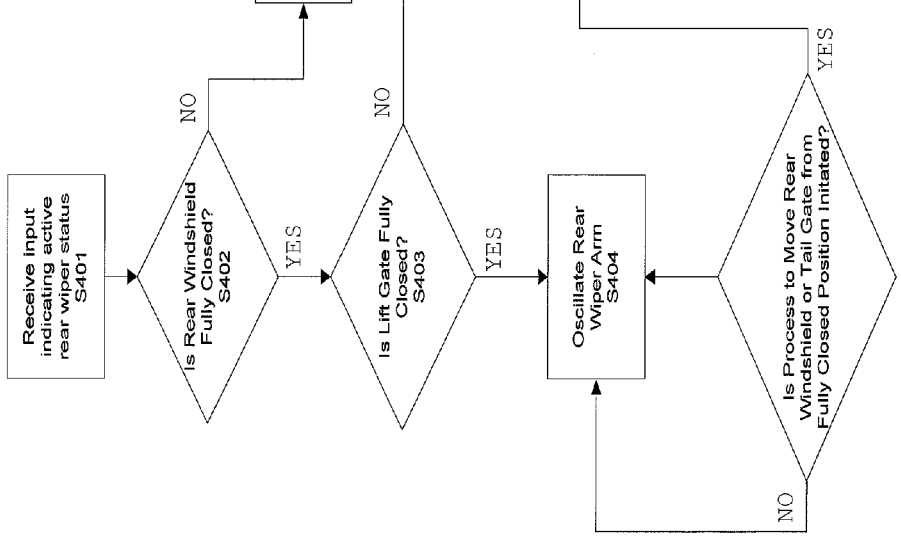
FIG. 13 is a flow chart illustrating a method to control a rear wiper arm of a rear wiper-washer system according to one embodiment of the invention.

With reference now to FIGS. 1 and 13, a flow chart of a control method 400 for controling the operation of the rear wiper-washer system 20 is shown. The rear windshield wiper switch 107 may transmit an input signal to the input circuit 314 indicating an active rear wiper status (step S401). The active rear wiper status may result from the vehicle operator manipulating the rear windshield wiper switch 107 from the off position to either the interval position, the low position, or the high position in order to cause the rear wiper arm 59 to oscillate between the first operating position OP1 and the second operating position OP2. Upon receipt of the input signal from the rear windshield wiper switch 107, the microprocessor 315 may determine the position of the rear windshield 12 (step S402). In one embodiment, the microprocessor 315 may determine the position of the rear windshield 12 based on data stored in an internal memory module (not shown) of the control system 300 wherein the data indicates the current status of the rear windshield position switch 105. The microprocessor 315 may determine the position of the rear windshield 12 utilizing any known method chosen with the sound judgment of a person using ordinary skill in the art.

With continued reference now to FIGS. 1 and 13, if the microprocessor 315 determines that the rear windshield 12 is in the fully closed position, the microprocessor 315 may then determine the position of the lift gate 13' (step S403). In one embodiment, the microprocessor 315 may determine the position of the lift gate 13' based on data stored in an internal memory module (not shown) of the control system 300 wherein the data indicates the current status of the lift gate position switch 103. If the microprocessor 315 determines that the rear windshield 12 and the lift gate 13' are in the fully closed position, the microprocessor 315 may cause the output circuit 316 to generate an output signal that causes the rear wiper arm 59 to oscillate between the first operating position OP1 and the second operating position OP2 (step S404).

With reference now to FIGS. 1, 6, 7, 12, and 14, the rear windshield washer operation will generally be described. In one embodiment, the vehicle operator may manipulate the rear windshield washer switch 106 from an off position to an on position in order to cause the fluid F to be dispensed onto the rear windshield 12. The rear windshield washer switch 106 may transmit an input signal to the input circuit 314 indicating an active rear washer status (step S450). Upon receipt of the input signal from the rear windshield washer switch 106, the microprocessor 315 may determine the position of the rear windshield 12 (step S451) and the position of the lift gate 13' (step S452) as described above. If the microprocessor 315 determines that the rear windshield 12 and the lift gate 13' are in the fully closed position, the microprocessor 315 may cause the output circuit 316 to generate an output signat that causes the washer motor pump 22 to operate (step S453) thereby causing the fluid F to be dispensed onto the rear windshield 12 as described above.

With continued reference now to FIGS. 1, 6, 7, 12, and 14, in one embodiment, the microprocessor 315 may determine the status of the rear wiper switch 107 (step S453a). If the microprocessor 315 determines the status of the rear wiper switch 107 to be active, the microprocessor 315 allows the rear wiper arm 59 to continue oscillating between the first operating position OP1 and the second operation position OP2 during the operation of the washer motor pump 22. If the microprocessor 315 determines the status of the rear wiper switch 107 to be inactive, the microprocessor 315 may cause the rear the output circuit 316 to generate an output signal that causes the rear wiper arm 59 to oscillate between the first operating position OP1 and the second operating position OP2 for a predetermined number of oscillations (step S453c). In one embodiment, the output circuit 316 may generate an output signal that causes the rear wiper arm 59 to oscillate between the first operating position OP1 and the second operating position OP2 at the second speed S2. In another embodiment, the output circuit 316 may generate an output signal that causes the rear wiper arm 59 to oscillate between the first operating position OP1 and the second operating position OP2 at the third speed S3. The output circuit 316 may generate an output signal that causes the rear wiper arm 59 to oscillate between the first operating position OP1 and the second operating position OP2 at any speed chosen with the sound judgment of a person using ordinary skill in the art.

With reference now to FIGS. 1, 6-8, 12, and 14, if, during the operation of the washer motor pump 22 or the rear wiper arm 59, the control system 300 determines the initiation of a process to move either the rear windshield 12 or the lift gate 13' from the closed position, the control sytem 300 may disable the rear wiper-washer system 20. In one embodiment, during the operation of either the washer motor pump 22 or the oscillation of the rear wiper arm 59, the rear windshield/tailgate release switch 102 may transmit an input signal to the input circuit 314 indicating the actuation of one of the plurality of manually actuated devices for causing the rear windshield 12 or the lift gate 13' to move from the fully closed position. The microprocessor 315 may process the input signal and determine the initiation of a process to move either the rear windshield 12 or the lift gate 13' from the closed position. The microprocessor may then disable the rear wiper-washer system 20. In one embodiment, the control system 300 may disable the rear wiper-washer system 20 by terminating the operation of the washer motor pump 22 and the rear wiper motor 116. In another embodiment, the microprocessor 315 may disable the washer motor pump 22 and the rear wiper motor 116 by preventing the output circuit from generating any output signal that may cause the washer motor pump 22 or the rear wiper motor 116 to operate. In yet another embodiment, the microprocessor 315 may cause the output circuit 316 to generate an output signal activating the rear wiper down relay 117 thereby causing the rear wiper arm 59 to move to the parked position PP. Substantially simultaneously, the microprocessor 315 may cause the termination of the operation of the washer motor pump 22. The microprocessor 315 may cause the rear wiper-washer system 20 to remain disabled until the microprocessor 315 determines that both the rear windshield 12 and the lift gate 13' are in the fully closed position.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A method comprising the steps of:
    (a) receiving a first input signal, wherein the first input initiates a process for causing the operation of a washer motor pump;
    (b) determining the position of a rear windshield;
    (c) operating the washer motor pump, wherein the washer motor pump operates to dispense a fluid onto the rear windshield, only if the position of the rear windshield is determined to be fully closed;
    (d) actuating one of a plurality of operator actuated devices for causing the rear windshield to move from the fully closed position; and
    (e) causing the immediate termination of the operation of the washer motor pump in response to the actuating of one of the plurality of operator actuated devices for causing the rear windshield to move.

2. The method of claim 1, wherein:
    step (b) further comprises determining the position of a lift gate; and
    step (c) further comprises operating the washer motor pump only if the position of the lift gate is determined to be fully closed.

3. The method of claim 2, wherein:
    step (d) further comprises actuating one of a plurality of operator actuated devices for causing the lift gate to move from the fully closed position; and,
    step (e) further comprises causing the immediate termination of the operation of the washer motor pump in response to the actuating of one of the plurality of operator actuated devices for causing the lift gate to move.

4. The method of claim 1, wherein step (c) further comprises the step of:
    oscillating a rear wiper arm between a first operating position and a second operating position.

5. A method comprising the steps of:
    (a) providing a vehicle comprising: (1) a rear-facing side; (2) a rear windshield; and, (3) an aperture formed in the rear-facing side; wherein the rear windshield is positional into a fully closed position where the rear windshield encloses the aperture and an open position where the rear windshield does not enclose the aperture;
    (b) providing a rear wiper-washer system comprising: (1) a rear wiper arm that is operable to at least partially remove debris from the rear windshield; and, (2) a fluid supply device that is operable to supply a fluid to the rear windshield;
    (c) providing a control system comprising: (1) a rear windshield position switch for use in generating a signal indicating the position of the rear windshield; (2) a fluid supply switch for use in generating an input signal to operate the fluid supply device to supply the fluid to the rear windshield; and (3) a windshield operator actuatable electrical switch for use in generating an input signal to position the rear windshield into the open position;
    (d) activating the fluid supply switch to generate the input signal to operate the fluid supply device to supply the fluid to the rear windshield;
    (e) determining with the control system the position of the rear windshield; and,
    (f) sending an output signal with the control system to operate the fluid supply device to supply the fluid to the rear windshield only if the control system first determines that the rear windshield is in the fully closed position;
    (g) actuating the windshield operator actuatable electrical switch; and
    (h) terminating the sending of the output signal to operate the fluid supply device in response to the actuating of the windshield operator actuatable electrical switch.

6. The method of claim 5 wherein:
    step (c) comprises the step of: providing the control system with a rear windshield wiper switch for use in generating an input signal to operate the rear wiper arm to remove debris from the rear windshield;
    step (d) comprises the step of: activating the rear windshield wiper switch to generate the input signal to operate the rear wiper arm to remove debris from the rear windshield; and,
    step (f) comprises the step of: sending an output signal with the control system to operate the rear wiper arm to remove debris from the rear windshield only if the control system first determines that the rear windshield is in the fully closed position.

7. The method of claim 6 wherein step (f) comprises the step of:
    sending an output signal with the control system to position the rear wiper arm in a parked position if the control system determines that the rear windshield is in the open position.

8. The method of claim 5 wherein:
    step (a) comprises the step of: providing the rear-facing side with an opening and a lift gate that is positional into a fully closed position where the lift gate encloses the opening and an open position where the lift gate does not enclose the opening; wherein the aperture and rear windshield are mounted to the lift gate;
    step (c) comprises the step of: providing the control system with a lift gate position switch for use in generating a signal indicating the position of the lift gate; and,
    step (f) comprises the step of: sending an output signal with the control system to operate the fluid supply device to supply the fluid to the rear windshield only if the control system first determines that the lift gate is in the fully closed position.

9. The method of claim 8 wherein:
    the method further comprises the step of: providing a lift gate operator actuatable electrical switch for use in generating an input signal to position the lift gate into the open position; and, step (f) comprises the step of determining that the lift gate is in the open position if the lift gate operator actuatable electrical switch has generated an input signal to position the lift gate into the open position.

10. The method of claim 5 wherein:
step (e) comprises the step of: determining that the rear windshield is in the open position if the windshield operator actuatable electrical switch has generated an input signal to position the rear windshield into the open position.

11. The method of claim 5 wherein the windshield operator actuatable electrical switch is positioned within an interior portion of the vehicle.

12. The method of claim 5 wherein the windshield operator actuatable electrical switch is positioned on an exterior surface of the vehicle.

13. The method of claim 5 wherein the windshield operator actuatable electrical switch is positioned on a key fob.

14. The method of claim 5 wherein:
step (b) comprises the step of: providing the fluid supply device with a motor pump that is operable to supply the fluid to the rear windshield; and,
step (h) comprises the step of immediately terminating the operation of the motor pump in response to the actuating of the windshield operator actuatable electrical switch.

15. The method of claim 5 wherein step (f) comprises the step of:
preventing the control system from generating an output signal to the fluid supply device if the control system determines that the rear windshield is in the open position.

16. A method comprising the steps of:
(a) providing a vehicle comprising: (1) a rear-facing side; (2) a rear windshield; and, (3) an aperture formed in the rear-facing side; wherein the rear windshield is positional into a fully closed position where the rear windshield encloses the aperture and an open position where the rear windshield does not enclose the aperture;
(b) providing a rear wiper-washer system comprising: (1) a rear wiper arm that is oscillateable to at least partially remove debris from the rear windshield; and, (2) a fluid supply device that is operable to supply a fluid to the rear windshield;
(c) providing a control system comprising: (1) a rear windshield position switch for use in generating a signal indicating the position of the rear windshield; (2) a fluid supply switch for use in generating an input signal to operate the fluid supply device to supply the fluid to the rear windshield; and, (3) a rear windshield wiper switch for use in generating an input signal to oscillate the rear wiper arm to remove debris from the rear windshield;
(d) providing a windshield operator actuatable electrical switch for use in generating an input signal to position the rear windshield into the open position;
(e) activating the fluid supply switch to generate the input signal to operate the fluid supply device to supply the fluid to the rear windshield;
(f) activating the rear windshield wiper switch to generate the input signal to oscillate the rear wiper arm to remove debris from the rear windshield;
(g) determining with the control system the position of the rear windshield;
wherein step (g) comprises the steps of:
generating the input signal, using the windshield operator actuatable electrical switch, to position the rear windshield into the open position; and
determining that the rear windshield is in the open position in response to the windshield operator actuatable electrical switch generating the input signal to position the rear windshield into the open position;
(h) sending an output signal with the control system to operate the fluid supply device to supply the fluid to the rear windshield only if the control system first determines that the rear windshield is in the fully closed position;
(i) sending an output signal with the control system to oscillate the rear wiper arm to remove debris from the rear windshield only if the control system first determines that the rear windshield is in the fully closed position; and
(j) terminating immediately the sending of the output signal to operate the fluid supply device in response to the generating of the input signal to position the rear windshield into the open position.

17. The method of claim 16 wherein:
step (a) comprises the step of: providing the rear-facing side with an opening and a lift gate that is positional into a fully closed position where the lift gate encloses the opening and an open position where the lift gate does not enclose the opening; wherein the aperture and rear windshield are mounted to the lift gate;
step (c) comprises the step of: providing the control system with a lift gate position switch for use in generating a signal indicating the position of the lift gate; and,
step (h) comprises the step of: sending an output signal with the control system to operate the fluid supply device to supply the fluid to the rear windshield only if the control system first determines that the lift gate is in the fully closed position.

18. The method of claim 17 wherein:
the method further comprises the step of: providing a lift gate operator actuatable electrical switch for use in generating an input signal to position the lift gate into the open position; and,
step (h) comprises the step of determining that the lift gate is in the open position if the lift gate operator actuatable electrical switch has generated an input signal to position the lift gate into the open position.

19. The method of claim 18 wherein step (h) comprises the step of:
preventing the control system from generating an output signal to the fluid supply device if the control system determines that the rear windshield is in the open position.

20. The method of claim 18 wherein:
step (j) further comprises terminating immediately the sending of the output signal to operate the fluid supply device if the lift gate operator actuatable electrical switch has generated an input signal to position the lift gate into the open position.

* * * * *